United States Patent
Zhang et al.

(10) Patent No.: US 12,225,054 B2
(45) Date of Patent: Feb. 11, 2025

(54) APPLICATION ISOLATION METHOD, SYSTEM AND DEVICE, AND COMPUTER-READABLE STORAGE MEDIUM

(71) Applicant: INSPUR ELECTRONIC INFORMATION INDUSTRY CO., LTD., Shandong (CN)

(72) Inventors: Qiang Zhang, Shandong (CN); Zhengwei Liu, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 246 days.

(21) Appl. No.: 17/928,113

(22) PCT Filed: Jan. 23, 2021

(86) PCT No.: PCT/CN2021/073438
§ 371 (c)(1),
(2) Date: Nov. 28, 2022

(87) PCT Pub. No.: WO2021/238256
PCT Pub. Date: Dec. 2, 2021

(65) Prior Publication Data
US 2023/0208881 A1    Jun. 29, 2023

(30) Foreign Application Priority Data
May 27, 2020 (CN) .......................... 202010461867.2

(51) Int. Cl.
*H04L 9/40* (2022.01)
*G06F 21/62* (2013.01)

(52) U.S. Cl.
CPC ............ *H04L 63/20* (2013.01); *G06F 21/629* (2013.01)

(58) Field of Classification Search
CPC ....... H04L 63/20; G06F 21/629; G06F 21/53; G06F 21/50
See application file for complete search history.

(56) References Cited

U.S. PATENT DOCUMENTS 10,855,531 B2 * 12/2020 Vaidya ................ H04L 41/0806
2009/0235324 A1 * 9/2009 Griffin .................. G06F 21/629
726/1

(Continued)

FOREIGN PATENT DOCUMENTS

CN   109561108 A   4/2019
CN   110266679 A   9/2019

(Continued)

OTHER PUBLICATIONS

PCT/CN2021/073438 international search report.

*Primary Examiner* — Mohammed Waliullah
(74) *Attorney, Agent, or Firm* — IPro, PLLC

(57) ABSTRACT

An application isolation method, system and device, and a computer-readable storage medium. The method includes: determining a target application to be isolated in Kubernetes; acquiring isolation polices of components in the target application, creating an initial network security policy corresponding to the target application; on the basis of the isolation policies, modifying a pushing rule, a popping nule and a matching label of the initial network security policy, so as to obtain a target network security policy; converting the target network security policy into an Iptables rule that matches the Kubernetes; and isolating the target application on the basis of the Iptables rule.

17 Claims, 3 Drawing Sheets

(56) References Cited

U.S. PATENT DOCUMENTS

| | | | | |
|---|---|---|---|---|
| 2018/0336351 A1* | 11/2018 | Jeffries | .................. | G06F 21/53 |
| 2019/0377591 A1* | 12/2019 | Dimitrov | ................ | H04L 63/20 |
| 2020/0076685 A1* | 3/2020 | Vaidya | ................ | G06F 9/44526 |

FOREIGN PATENT DOCUMENTS

| | | |
|---|---|---|
| CN | 111049796 A | 4/2020 |
| CN | 111709014 A | 9/2020 |

\* cited by examiner

APPLICATION ISOLATION METHOD, SYSTEM AND DEVICE, AND COMPUTER-READABLE STORAGE MEDIUM

CROSS-REFERENCE TO RELATED APPLICATION

The present disclosure claims the priority of the Chinese patent application filed on May 27, 2020 before the CNIPA, China National Intellectual Property Administration with the application number of 202010461867.2 and the title of "APPLICATION ISOLATION METHOD, SYSTEM AND DEVICE, AND COMPUTER-READABLE STORAGE MEDIUM", which is incorporated herein in its entirety by reference.

FIELD

The present application relates to the field of application isolation and, more particularly, to an application isolation method, system and apparatus, and a computer readable storage medium.

BACKGROUND

Kubernetes, or K8s, is an abbreviation where 8 denotes eight characters, i.e., "ubernete", and is an open-source application for managing containerization at multiple hosts on a cloud platform. Kubernetes is intended to provide a simple and powerful application for the deployment of the containerization. Kubernetes provides a mechanism for application deployment, planning, updating, and maintenance.

In the application of Kubernetes, it is sometimes, for the purpose of security and limiting network traffic, necessary to control connectivity between entities, for example, by isolating an application; however, there is no such method for isolating an application in the prior art.

In summary, how to realize application isolation in Kubernetes is an urgent problem to be solved by those skilled in the art now.

SUMMARY

It is an object of the present application to provide an application isolation method, which may solve to some extent the technical problem of how to achieve application isolation within Kubernetes. The present application also provides an application isolation system and apparatus, and a computer readable storage medium.

To achieve the above-mentioned object, the present application provides the following technical solution, that is, an application isolation method, including:
  determining a target application to be isolated in Kubernetes;
  acquiring an isolation policy for each component in the target application;
  creating an initial network security policy corresponding to the target application;
  modifying a push rule, a pop rule, and a match label of the initial network security policy according to the isolation policy to obtain a target network security policy;
  converting the target network security policy into an Iptables rule matching the Kubernetes; and
  isolating the target application according to the Iptables rule.

In an embodiment of the present application, creating the initial network security policy corresponding to the target application includes:
  creating the initial network security policy;
  setting a podSelector field of the initial network security policy as in a form of matchExpression;
  setting a value of an operator of the initial network security policy as a conditional operator In; and
  setting the match label of the initial network security policy as a set of identifications of all components in the target application.

In an embodiment of the present application, modifying the push rule, the pop rule, and the match label of the initial network security policy according to the isolation policy includes:
  modifying the push rule according to a passive access policy in the isolation policy;
  modifying the pop rule according to an active access policy in the isolation policy; and
  setting a value of the match label as an identification of the component being isolated in the isolation policy;
  wherein the passive access policy characterizes a policy of other components accessing the components of the target application; and
  the active access policy characterizes the policy of the components of the target application accessing other components.

In an embodiment of the present application, modifying the push rule according to the passive access policy in the isolation policy includes:
  determining a first component corresponding to the passive access policy;
  changing a port number corresponding to the first component in the push rule to a corresponding port number in the passive access policy;
  changing a network data exchange rule corresponding to the first component in the push rule to a corresponding network data exchange rule in the passive access policy; and
  changing the podSelector field corresponding to the first component in the push rule to matchlabel, and setting a value of the matchlabel to be an identification of corresponding other components in the passive access policy.

In an embodiment of the present application, modifying the pop rule according to the active access policy in the isolation policy includes:
  determining a second component corresponding to the active access policy;
  changing a port number corresponding to the second component in the pop rule to a corresponding port number in the active access policy;
  changing a network data exchange rule corresponding to the second component in the pop rule to a corresponding network data exchange rule in the active access policy; and
  changing the podSelector field corresponding to the second component in the pop rule to matchlabel, and setting a value of the matchlabel as an identification of corresponding other components in the active access policy.

In an embodiment of the present application, before determining the target application to be isolated in Kubernetes, further including:
  deploying a calico network plug-in in the Kubernetes;
  setting the calico node in the calico network plug-in to operate in a demonest mode; and setting a calicocontroller in the calico network plug-in to run in a stateless load mode.

In an embodiment of the present application, the identification of the component includes a label of the component.

An application isolation system, including:
a first determination module configured for determining a target application to be isolated in the Kubernetes;
a first acquisition module configured for acquiring an isolation policy for each component in the target application;
a first creation module configured for creating an initial network security policy corresponding to the target application;
a first modification module configured for modifying a push rule, a pop rule, and a match label of the initial network security policy according to the isolation policy to obtain a target network security policy;
a first conversion module configured for converting the target network security policy into an Iptables rule matching the Kubernetes; and
a first isolation module configured for isolating the target application according to the Iptables rule.

An application isolation apparatus, including:
a memory configured for storing a computer program; and
a processor configured for implementing the steps of the application isolation method as described in any one of the above when executing the computer program.

A computer readable storage medium having stored therein a computer program which when executed by a processor implements the steps of the application isolation method as claimed in any of the above.

According to the application isolation method provided in the present application, a target application to be isolated in Kubernetes is determined; an isolation policy is acquired for each component in the target application; an initial network security policy is created corresponding to the target application; a push rule, a pop rule, and a match label of the initial network security policy are modified according to the isolation policy to obtain a target network security policy; the target network security policy is converted into an Iptables rule matching the Kubernetes; and the target application is isolated according to the Iptables rule.

In the present application, the push rule, the pop rule and the matchlabel of the initial network security policy may be modified according to the isolation policy of a component, so as to obtain the target network security policy consistent with the isolation policy, and then the target network security policy is converted into the Iptables rule matching the Kubernetes, so that the target application may be isolated according to the Iptables rule, and the isolation of an application in the Kubernetes is enabled. The application isolation system and apparatus, and the computer readable storage medium provided in the present application also solve the corresponding technical problem.

BRIEF DESCRIPTION OF THE DRAWINGS

In order to more clearly explain the technical solution in the embodiment or the existing technology of the present disclosure, the following will briefly introduce the drawings that need to be used in the embodiment or the existing technology description. Obviously, the drawings in the following description are only the embodiment of the present disclosure. For a person skilled in the art, other drawings may be obtained according to the provided drawings without paying creative labor.

DETAILED DESCRIPTION

A more complete description of the embodiments of the present disclosure will be rendered by reference to the appended drawings, which are provided for purposes of illustration and are not intended to be exhaustive of or limiting the present disclosure. All the other embodiments obtained by a person of ordinary skill in the art based on the embodiments in the present application without involving any inventive effort shall fall within the scope of the present application.

Figure 1:
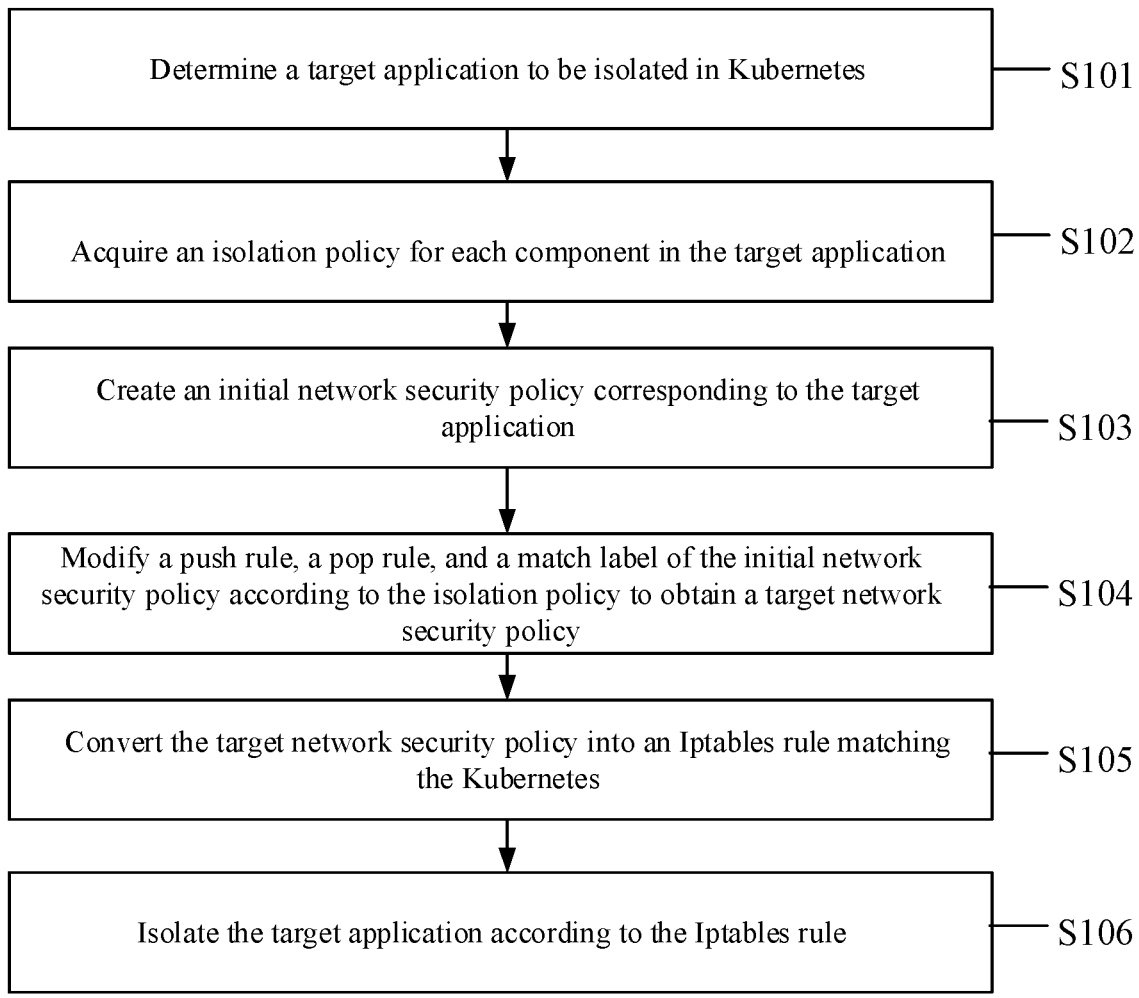
FIG. 1 is a flow chart of an application isolation method provided by an embodiment of the present application.

Reference is now made to FIG. 1, which is a flow chart of an application isolation method according to an embodiment of the present application.

An application isolation method provided by an embodiment of the present application may include the following steps.

In step S101, a target application to be isolated in Kubernetes is determined.

In practical applications, the target application to be isolated in the Kubernetes may be determined first, a type and a quantity of the target applications may both be determined according to practical requirements, and the target application to be isolated may be specified by a user and others.

In step S102, an isolation policy is acquired for each component in the target application.

In practical applications, after the target application to be isolated in the Kubernetes is determined, an isolation policy for each component in the target application may be acquired, and the isolation policy may also be specified by a user and others.

In step S103, an initial network security policy corresponding to the target application is created.

In practical applications, after acquiring the isolation policy for each component in the target application, an initial network security policy (NetWorkPolicy) corresponding to the target application may be created for isolating each component of the target application, for example, complete isolation or complete disclosure.

In step S104, a push rule, a pop rule, and a match label of the initial network security policy are modified according to the isolation policy to obtain a target network security policy.

In practical applications, since the push rule of the initial network policy may limit the other components to access the access information of the component, the pop rule may limit the component to access the access information of other components, and the match label may limit the identity information of other components, hence after the creation of the initial network security policy corresponding to the target application, the push rule, the pop rule, and the match label of the initial network security policy may be modified according to the isolation policy to obtain the target network security policy consistent with the isolation policy.

In step S105, the target network security policy is converted into an Iptables rule matching the Kubernetes.

In step S106, the target application is isolated according to the Iptables rule.

In practical applications, after the target network security policy is obtained, the target network security policy may be converted into the Iptables rule matching with the Kubernetes, and the target application is isolated according to the Iptables rule, so as to realize the isolation of the target application in the Kubernetes. Herein, the Iptables rule is an IP information packet filtering system integrated with the latest version 3.5 Linux kernel, and on the condition that the Linux system is connected to the Internet or LAN, a server or a proxy server connected to the LAN (local area network) and the Internet, such a system facilitates better control of IP information packet filtering and firewall configuration in the Linux system.

According to the application isolation method provided in the present application, a target application to be isolated in Kubernetes is determined; an isolation policy is acquired for each component in the target application; an initial network security policy is created corresponding to the target application; a push rule, a pop rule, and a match label of the initial network security policy are modified according to the isolation policy to obtain a target network security policy; the target network security policy is converted into a Iptables rule matching the Kubernetes; and the target application is isolated according to the Iptables rule. In the present application, the push rule, the pop rule, and the match label of the initial network security policy may be modified according to the isolation policy of a component, so as to obtain the target network security policy consistent with the isolation policy, and then the target network security policy is converted into the Iptables rule matching the Kubernetes, so that the target application may be isolated according to the Iptables rule, and the isolation of an application in the Kubernetes is enabled.

According to the application isolation method provided herein, the step of creating an initial network security policy corresponding to the target application may include: creating the initial network security policy; setting a podSelector field of the initial network security policy as in a form of matchExpression; setting a value of an operator of the initial network security policy as a conditional operator In; and setting the match label of the initial network security policy as a set of identifications of all components in the target application. It should be noted that in the process of setting the match label of the initial network security policy as a set of identifications of all components in the target application, the identifications may be separated by commas, so that the quantity of network security policies (NetWorkPolicy) may be reduced, thereby avoiding the inefficiency caused by creating a large number of Iptables rules on a host machine; furthermore, after the initial network security policy is set according to the above-mentioned operation, the current application is in a completely isolated state, i.e., no traffic is allowed to enter the application and no traffic is allowed to flow out of the current application.

According to the application isolation method provided herein, the step of modifying the push rule, the push rule and the matchlabel of the initial network security policy according to the isolation policy may include: modifying the push rule according to a passive access policy in the isolation policy; modifying the pop rule according to an active access policy in the isolation policy; and setting a value of the match label as an identification of the component being isolated in the isolation policy, wherein the passive access policy characterizes a policy of other components accessing the components of the target application, and the active access policy characterizes the policy of the components of the target application accessing other components. That is to say, the passive access policy, the active access policy and the identification of the isolated component may be set in the isolation policy; subsequently, the push rule may be directly modified according to the passive access policy in the isolation policy; the pop rule may be modified according to the active access policy in the isolation policy; and the value of the match label is set as the identification of the isolated component in the isolation policy, thereby quickly completing the modification of the initial network security policy.

In practical applications, the process of modifying the push rule according to a passive access policy in the isolation policy may include: determining a first component corresponding to the passive access policy; changing a port number corresponding to the first component in the push rule to a corresponding port number in the passive access policy; changing a network data exchange rule corresponding to the first component in the push rule to a corresponding network data exchange rule in the passive access policy; and changing the podSelector field corresponding to the first component in the push rule to matchlabel, and setting a value of the matchlabel to be an identification of corresponding other components in the passive access policy.

In practical applications, the step of modifying the pop rule according to the active access policy in the isolation policy may include: determining a second component corresponding to the active access policy; changing a port number corresponding to the second component in the pop rule to a corresponding port number in the active access policy; changing a network data exchange rule corresponding to the second component in the pop rule to a corresponding network data exchange rule in the active access policy; and changing the podSelector field corresponding to the second component in the pop rule to matchlabel, and setting a value of the matchlabel as an identification of corresponding other components in the active access policy.

According to the application isolation method provided herein, for communication between applications in the Kubernetes, before determining a target application to be isolated in Kubernetes, the method may further include: deploying a calico network plug-in in the Kubernetes; setting the calico node in the calico network plug-in to operate in a demonest mode; and setting a calicocontroller in the calico network plug-in to run in a stateless load mode. Herein, calico is a pure three-layer protocol, which provides multi-host communication for Docker containers, and in such a pure three-layer method, virtual routes are used instead of virtual exchanges, and each virtual route propagates (routes) reachable information to the remaining data centers through the border gateway protocol (BGP protocol).

In practical applications, the identification of the component may include a label or the like of the component.

Figure 2:
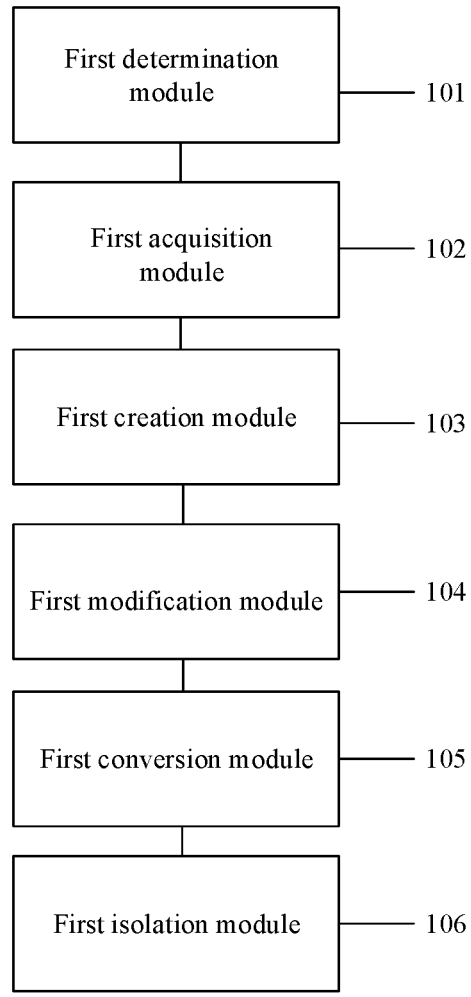
FIG. 2 is a schematic structural diagram of an application isolation system according to an embodiment of the present application.

Reference is made to FIG. 2, a schematic structural diagram of an application isolation system according to an embodiment of the present application.

An application isolation system provided by an embodiment of the present application may include:

a first determination module 101 for determining a target application to be isolated in the Kubernetes;

a first acquisition module 102 for acquiring an isolation policy for each component in the target application;

a first creation module 103 for creating an initial network security policy corresponding to the target application;

a first modification module 104 for modifying a push rule, a pop rule, and a match label of the initial network security policy according to the isolation policy to obtain a target network security policy;

a first conversion module 105 for converting the target network security policy into an Iptables rule matching the Kubernetes; and a first isolation module 106 for isolating the target application according to the Iptables rule.

According to the application isolation system provided herein, the first creation module may include:

a first creation unit configured for creating the initial network security policy;

a first setting unit configured for setting a podSelector field of the initial network security policy as in a form of matchExpression;

a second setting unit configured for setting a value of an operator of the initial network security policy as a conditional operator In; and a third setting unit configured for setting the match label of the initial network security policy as a set of identifications of all components in the target application.

According to the application isolation system provided herein, the first modification module may include:

a first modification sub-module configured for modifying the push rule according to a passive access policy in the isolation policy;

a second modification sub-module configured for modifying the pop rule according to an active access policy in the isolation policy;

a first setting sub-module configured for setting a value of the match label as an identification of the component being isolated in the isolation policy;

wherein the passive access policy characterizes a policy of other components accessing the components of the target application, and the active access policy characterizes the policy of the components of the target application accessing other components.

According to the application isolation system provided herein, the first modification sub-module may include:

a first determination unit configured for determining a first component corresponding to the passive access policy;

a first modification unit configured for changing a port number corresponding to the first component in the push rule to a corresponding port number in the passive access policy;

a second modification unit configured for changing a network data exchange rule corresponding to the first component in the push rule to a corresponding network data exchange rule in the passive access policy; and a third modification unit configured for changing the podSelector field corresponding to the first component in the push rule to matchlabel, and setting a value of the matchlabel to be an identification of corresponding other components in the passive access policy.

According to the application isolation system provided herein, the second modification sub-module may include:

a second determination unit configured for determining a second component corresponding to the active access policy;

a fourth modification unit configured for changing a port number corresponding to the second component in the pop rule to a corresponding port number in the active access policy;

a fifth modification unit configured for changing a network data exchange rule corresponding to the second component in the pop rule to a corresponding network data exchange rule in the active access policy; and a sixth modification unit configured for changing the podSelector field corresponding to the second component in the pop rule to matchlabel, and setting a value of the matchlabel as an identification of corresponding other components in the active access policy.

The application isolation system provided by an embodiment of the present application may further include:

a first deployment module configured for deploying a calico network plug-in in the Kubernetes before determining a target application to be isolated in Kubernetes;

a first setting module configured for setting the calico node in the calico network plug-in to operate in a demonest mode; and a second setting module configured for setting a calico-controller in the calico network plug-in to run in a stateless load mode.

According to the application isolation system provided herein, the identification of a component may include a label of the component.

Figure 3:
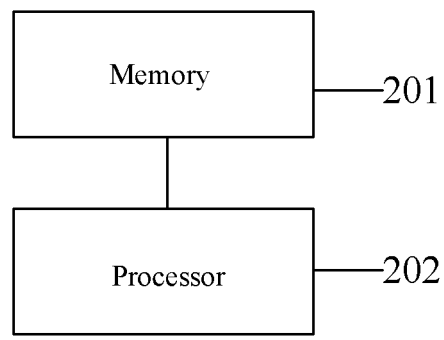
FIG. 3 is a schematic structural diagram of an application isolation apparatus according to an embodiment of the present application.

Further, the present application provides an application isolation apparatus and a computer readable storage medium, which both have the corresponding effects of the application isolation method provided by the embodiment of the present application. Reference is made to FIG. 3, a schematic structural diagram showing a configuration of an application isolation apparatus according to an embodiment of the present application.

An application isolation apparatus provided by an embodiment of the present application includes a memory 201 and a processor 202, wherein the memory 201 stores a computer program, and when executing the computer program, the processor 202 implements the steps of:

determining a target application to be isolated in Kubernetes;

acquiring an isolation policy for each component in the target application;

creating an initial network security policy corresponding to the target application;

modifying a push rule, a pop rule, and a match label of the initial network security policy according to the isolation policy to obtain a target network security policy;

converting the target network security policy into an Iptables rule matching the Kubernetes; and isolating the target application according to the Iptables rule.

An application isolation apparatus provided by an embodiment of the present application includes a memory 201 and a processor 202, wherein the memory 201 stores a computer program, and when executing the computer program, the processor 202 implements the steps of: creating the initial network security policy; setting a podSelector field of the initial network security policy as in a form of matchExpression; setting a value of an operator of the initial network security policy as a conditional operator In; and setting the match label of the initial network security policy as a set of identifications of all components in the target application.

An application isolation apparatus provided by an embodiment of the present application includes a memory 201 and a processor 202, wherein the memory 201 stores a computer program, and when executing the computer program, the processor 202 implements the steps of: modifying the push rule according to a passive access policy in the isolation policy; modifying the pop rule according to an active access policy in the isolation policy; and setting a value of the match label as an identification of the component being isolated in the isolation policy, wherein the passive access policy characterizes a policy of other components accessing the components of the target application, and the active access policy characterizes the policy of the components of the target application accessing other components.

An application isolation apparatus provided by an embodiment of the present application includes a memory 201 and a processor 202, wherein the memory 201 stores a computer program, and when executing the computer program, the processor 202 implements the steps of: determining a first component corresponding to the passive access policy; changing a port number corresponding to the first component in the push rule to a corresponding port number in the passive access policy; changing a network data exchange rule corresponding to the first component in the push rule to a corresponding network data exchange rule in the passive access policy; and changing the podSelector field corresponding to the first component in the push rule to matchlabel, and setting a value of the matchlabel to be an identification of corresponding other components in the passive access policy.

An application isolation apparatus provided by an embodiment of the present application includes a memory 201 and a processor 202, wherein the memory 201 stores a computer program, and when executing the computer program, the processor 202 implements the steps of: determining a second component corresponding to the active access policy; changing a port number corresponding to the second component in the pop rule to a corresponding port number in the active access policy; changing a network data exchange rule corresponding to the second component in the pop rule to a corresponding network data exchange rule in the active access policy; and changing the podSelector field corresponding to the second component in the pop rule to matchlabel, and setting a value of the matchlabel as an identification of corresponding other components in the active access policy.

An application isolation apparatus provided by an embodiment of the present application includes a memory 201 and a processor 202, wherein the memory 201 stores a computer program, and when executing the computer program, the processor 202 implements the steps of: before determining a target application to be isolated in Kubernetes, deploying a calico network plug-in in the Kubernetes; setting the calico node in the calico network plug-in to operate in a demonest mode; and setting a calicocontroller in the calico network plug-in to run in a stateless load mode.

An application isolation apparatus provided by an embodiment of the present application includes a memory 201 and a processor 202, wherein the memory 201 stores a computer program, and when executing the computer program, the processor 202 implements the steps where the identification of a component includes a label of the component.

Figure 4:
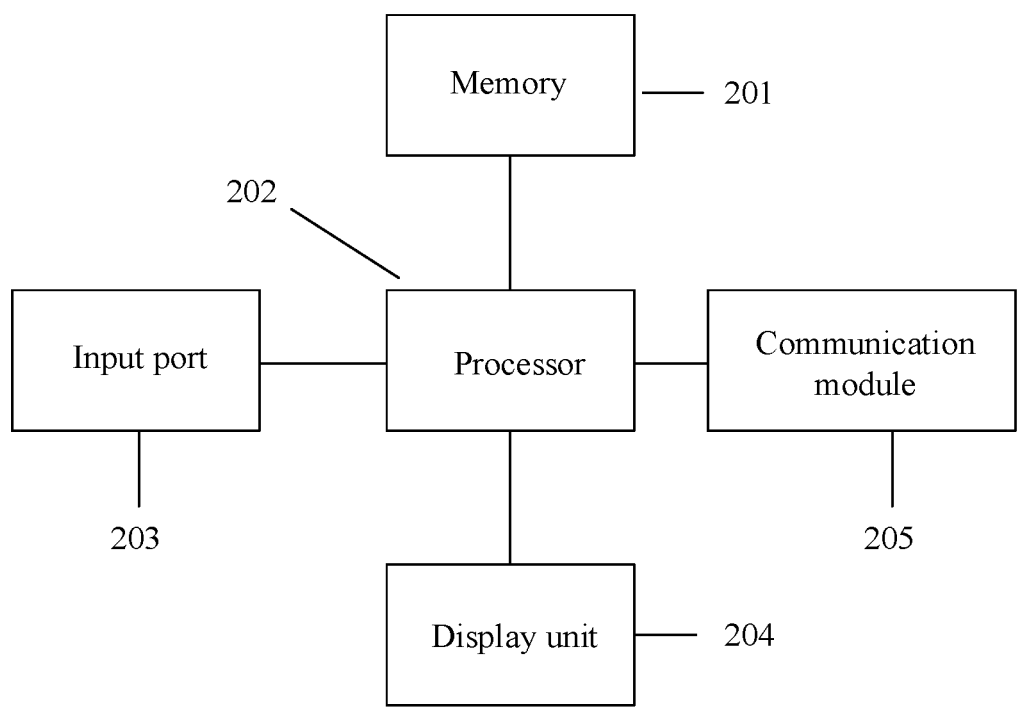
FIG. 4 is another schematic structural diagram of an application isolation apparatus according to an embodiment of the present application.

With reference to FIG. 4, another application isolation apparatus provided by an embodiment of the present application may further include: an input port 203 connected to the processor 202 configured for transmitting an external instruction to the processor 202; a display unit 204 connected to the processor 202 configured for displaying a processing result of the processor 202 to an outsider; a communication module 205 connected to the processor 202 configured for enabling the application isolation apparatus to communicate with the outsider. The display unit 204 may be a display panel, a laser scanning display, and the like; the communication modes adopted by the communication module 205 include, but are not limited to, mobile high definition link technology (HML), universal serial bus (USB), high definition multimedia interface (HDMI) and wireless connection such as Wireless Fidelity (Wi-Fi), Bluetooth, Low-power Bluetooth, and IEEE802.11s-based communication technology.

The embodiments of the present application provide a computer readable storage medium, wherein a computer program is stored in the computer readable storage medium, and when executed by a processor, the computer program implements the steps of:

determining a target application to be isolated in Kubernetes;

acquiring an isolation policy for each component in the target application;

creating an initial network security policy corresponding to the target application;

modifying a push rule, a pop rule, and a match label of the initial network security policy according to the isolation policy to obtain a target network security policy;

converting the target network security policy into an Iptables rule matching the Kubernetes; and isolating the target application according to the Iptables rule.

The embodiments of the present application provide a computer readable storage medium, wherein a computer program is stored in the computer readable storage medium, and when executed by a processor, the computer program implements the steps of: creating the initial network security policy; setting a podSelector field of the initial network security policy as in a form of matchExpression; setting a value of an operator of the initial network security policy as a conditional operator In; and setting the match label of the initial network security policy as a set of identifications of all components in the target application.

The embodiments of the present application provide a computer readable storage medium, wherein a computer program is stored in the computer readable storage medium, and when executed by a processor, the computer program implements the steps of: modifying the push rule according to a passive access policy in the isolation policy; modifying the pop rule according to an active access policy in the isolation policy; and setting a value of the match label as an identification of the component being isolated in the isolation policy, wherein the passive access policy characterizes a policy of other components accessing the components of the target application, and the active access policy characterizes the policy of the components of the target application accessing other components.

The embodiments of the present application provide a computer readable storage medium, wherein a computer program is stored in the computer readable storage medium, and when executed by a processor, the computer program implements the steps of: determining a first component corresponding to the passive access policy; changing a port number corresponding to the first component in the push rule to a corresponding port number in the passive access policy; changing a network data exchange rule corresponding to the first component in the push rule to a corresponding network data exchange rule in the passive access policy; and changing the podSelector field corresponding to the first component in the push rule to matchlabel, and setting a value of the matchlabel to be an identification of corresponding other components in the passive access policy.

The embodiments of the present application provide a computer readable storage medium, wherein a computer program is stored in the computer readable storage medium, and when executed by a processor, the computer program implements the steps of: determining a second component corresponding to the active access policy; changing a port number corresponding to the second component in the pop rule to a corresponding port number in the active access policy; changing a network data exchange rule corresponding to the second component in the pop rule to a corresponding network data exchange rule in the active access policy; and changing the podSelector field corresponding to the second component in the pop rule to matchlabel, and setting a value of the matchlabel as an identification of corresponding other components in the active access policy.

The embodiments of the present application provide a computer readable storage medium, wherein a computer program is stored in the computer readable storage medium, and when executed by a processor, the computer program implements the steps of: before determining a target application to be isolated in Kubernetes, deploying a calico network plug-in in the Kubernetes; setting the calico node in the calico network plug-in to operate in a demonest mode; and setting a calicocontroller in the calico network plug-in to run in a stateless load mode.

The embodiments of the present application provide a computer readable storage medium, wherein a computer program is stored in the computer readable storage medium, and when executed by a processor, the computer program implements the steps where the identification of a component includes a label of the component.

The computer readable storage medium referred to herein may be RAM, a memory, ROM, electrically programmable ROM, electrically erasable programmable ROM, registers, hard disk, a removable disk, a CD-ROM, or any other form of storage medium known in the art.

The description on the related part of the application isolation system and apparatus, and a computer readable storage medium according to the embodiments of the present disclosure may refer to the detailed description on the corresponding part in the application isolation method according to the embodiments of the present disclosure, and is not discussed herein further. Furthermore, the parts of the above technical solutions according to the embodiments of the present disclosure that have the same principles of implementation as those of the corresponding technical solutions in the prior art are not described in detail, to avoid excessively replicated description.

It should also be noted that the relational terms such as "first" and "second" in the present specification are used solely to distinguish one entity or operation from another entity or operation without necessarily requiring or implying any actual such relationship or order between such entities or operations. Furthermore, the terms like "include", "comprise", or any other variations thereof, are intended to indicate a non-exclusive inclusion, such that a process, method, article, or apparatus that includes a list of elements does not include only those elements but may include other elements not expressly listed or inherent to such process, method, article, or apparatus. An element defined by a phrase like "includes a . . . " does not, without further constraints, preclude the existence of additional identical elements in the process, method, article, or apparatus that includes the element.

The above description on the disclosed embodiments enables a person skilled in the art to implement or use the present disclosure. Various modifications on those embodiments will be apparent to a person skilled in the art, and the general principle defined herein may be implemented in other embodiments without departing from the spirit or scope of the present disclosure. Therefore, the present disclosure should not be limited to the embodiments illustrated herein, but should meet the broadest scope in accord with the principle and the novel characteristics disclosed herein.

The invention claimed is:

1. An application isolation method, comprising:
   determining a target application to be isolated in Kubernetes;
   acquiring an isolation policy for each component in the target application;
   creating an initial network security policy corresponding to the target application;
   modifying a push rule, a pop rule, and a match label of the initial network security policy according to the isolation policy to obtain a target network security policy;
   converting the target network security policy into an Iptables rule matching the Kubernetes; and
   isolating the target application according to the Iptables rule-¿ creating the initial network security policy corresponding to the target application comprises:
   creating the initial network security policy;
   setting a podSelector field of the initial network security policy as in a form of matchExpression;
   setting a value of an operator of the initial network security policy as a conditional operator In; and
   setting the match label of the initial network security policy as a set of identifications of all components in the target application.

2. The method according to claim 1, wherein modifying the push rule, the pop rule, and the match label of the initial network security policy according to the isolation policy comprises:
   modifying the push rule according to a passive access policy in the isolation policy;
   modifying the pop rule according to an active access policy in the isolation policy; and
   setting a value of the match label as an identification of the component being isolated in the isolation policy;
   wherein the passive access policy characterizes a policy of other components accessing the components of the target application; and
   the active access policy characterizes the policy of the components of the target application accessing other components.

3. The method according to claim 2, wherein modifying the push rule according to the passive access policy in the isolation policy comprises:
   determining a first component corresponding to the passive access policy;
   changing a port number corresponding to the first component in the push rule to a corresponding port number in the passive access policy;
   changing a network data exchange rule corresponding to the first component in the push rule to a corresponding network data exchange rule in the passive access policy; and
   changing the podSelector field corresponding to the first component in the push rule to matchlabel, and setting a value of the matchlabel to be an identification of corresponding other components in the passive access policy.

4. The method according to claim 3, wherein modifying the pop rule according to the active access policy in the isolation policy comprises:

determining a second component corresponding to the active access policy;
changing a port number corresponding to the second component in the pop rule to a corresponding port number in the active access policy;
changing a network data exchange rule corresponding to the second component in the pop rule to a corresponding network data exchange rule in the active access policy; and
changing the podSelector field corresponding to the second component in the pop rule to matchlabel, and setting a value of the matchlabel as an identification of corresponding other components in the active access policy.

5. The method according to claim 1, before determining the target application to be isolated in Kubernetes, further comprising:
deploying a calico network plug-in in the Kubernetes;
setting the calico node in the calico network plug-in to operate in a demonest mode; and
setting a calico controller in the calico network plug-in to run in a stateless load mode.

6. The method according to claim 5, wherein the identification of the component comprises a label of the component.

7. The application isolation method according to claim 5, wherein calico is a pure three-layer protocol that provides multi-host communication for Docker containers.

8. The application isolation method according to claim 7, wherein in the pure three-layer protocol, virtual routes are used instead of virtual exchanges, and each virtual route propagates reachable information to remaining data centers through the border gateway protocol.

9. The application isolation method according to claim 1, wherein the initial network security policy is a network security policy for isolating each component of the target application.

10. The application isolation method according to claim 9, wherein isolating each component of the target application comprises: complete isolation or complete disclosure.

11. The application isolation method according to claim 1, wherein the push rule is to limit other components to access the access information of the current component;
the pop rule is to limit the current component to access the access information of other components; and
the match label is to limit identity information of other components.

12. The application isolation method according to claim 1, wherein the Iptables rule is an IP information packet filtering system integrated with version 3.5 Linux kernel.

13. The application isolation method according to claim 1, wherein commas are added between the identifications to separate the identifications.

14. An application isolation apparatus, comprising:
a processor; and
a memory, storing a computer program that is executed executable by a processor, and upon execution by the processor, is configured to cause the processor to a processor configured for implementing steps:
determine a target application to be isolated in Kubernetes;
acquire an isolation policy for each component in the target application;
create an initial network security policy corresponding to the target application;
modify a push rule, a pop rule, and a match label of the initial network security policy according to the isolation policy to obtain a target network security policy;
convert the target network security policy into an Iptables rule matching the Kubernetes; and
isolate the target application according to the Iptables rule;
creating the initial network security policy corresponding to the target application comprises:
creating the initial network security policy;
setting a podSelector field of the initial network security policy as in a form of matchExpression;
setting a value of an operator of the initial network security policy as a conditional operator In; and
setting the match label of the initial network security policy as a set of identifications of all components in the target application.

15. The application isolation apparatus according to claim 14, wherein modifying the push rule, the pop rule, and the match label of the initial network security policy according to the isolation policy comprises:
modifying the push rule according to a passive access policy in the isolation policy;
modifying the pop rule according to an active access policy in the isolation policy; and
setting a value of the match label as an identification of the component being isolated in the isolation policy;
wherein the passive access policy characterizes a policy of other components accessing the components of the target application; and
the active access policy characterizes the policy of the components of the target application accessing other components.

16. The application isolation apparatus according to claim 15, wherein modifying the push rule according to the passive access policy in the isolation policy comprises:
determining a first component corresponding to the passive access policy;
changing a port number corresponding to the first component in the push rule to a corresponding port number in the passive access policy;
changing a network data exchange rule corresponding to the first component in the push rule to a corresponding network data exchange rule in the passive access policy; and
changing the podSelector field corresponding to the first component in the push rule to matchlabel, and setting a value of the matchlabel to be an identification of corresponding other components in the passive access policy.

17. A non-transitory computer-readable storage medium storing a computer program that is executed executable by a processor, and upon execution by the processor, is configured to cause the processor to:
determine a target application to be isolated in the Kubernetes;
acquire an isolation policy for each component in the target application;
creat an initial network security policy corresponding to the target application;
modify a push rule, a pop rule, and a match label of the initial network security policy according to the isolation policy to obtain a target network security policy;
convert the target network security policy into an Iptables rule matching the Kubernetes; and isolate the target application according to the Iptables rule;
creating the initial network security policy corresponding to the target application comprises:
creating the initial network security policy;
setting a podSelector field of the initial network security policy as in a form of match Expression;
setting a value of an operator of the initial network security policy as a conditional operator In; and
setting the match label of the initial network security policy as a set of identifications of all components in the target application.

* * * * *